(12) United States Patent
Zeller et al.

(10) Patent No.: US 8,120,895 B2
(45) Date of Patent: Feb. 21, 2012

(54) MOUNTING ASSEMBLY HAVING A BASE WITH AN INNER BALL POSITIONED WITHIN A HOLLOW OUTER BALL

(75) Inventors: Jacob T. Zeller, Spring Hill, KS (US); John R. Tines, Overland Park, KS (US)

(73) Assignee: Garmin Switzerland GmbH (CH)

( * ) Notice: Subject to any disclaimer, the term of this patent is extended or adjusted under 35 U.S.C. 154(b) by 167 days.

(21) Appl. No.: 12/721,966

(22) Filed: Mar. 11, 2010

(65) Prior Publication Data
US 2011/0223802 A1    Sep. 15, 2011

(51) Int. Cl.
*H05K 5/00* (2006.01)
*H01R 39/00* (2006.01)
(52) U.S. Cl. .................... 361/679.01; 439/17
(58) Field of Classification Search ............... 439/17; 362/394
See application file for complete search history.

(56) References Cited

U.S. PATENT DOCUMENTS

| | | | |
|---|---|---|---|
| 3,387,250 A * | 6/1968 | Bjorn et al. | 439/17 |
| 6,170,967 B1 * | 1/2001 | Usher et al. | 362/394 |
| 6,173,933 B1 * | 1/2001 | Whiteside et al. | 248/276.1 |
| 6,464,185 B1 * | 10/2002 | Minelli et al. | 248/183.1 |
| 6,915,996 B2 * | 7/2005 | Lin | 248/288.51 |
| 7,296,771 B2 * | 11/2007 | Kalis et al. | 248/288.31 |
| 7,355,302 B2 | 4/2008 | Stonestreet, II et al. | 307/29 |
| 7,475,858 B2 * | 1/2009 | Kalis et al. | 248/288.31 |
| 7,516,928 B2 * | 4/2009 | Kalis et al. | 248/288.31 |
| 2005/0127261 A1 * | 6/2005 | Lin | 248/288.51 |
| 2009/0097192 A1 * | 4/2009 | Riddiford | 361/679.01 |
| 2009/0168308 A1 * | 7/2009 | O'Brien et al. | 361/679.01 |
| 2010/0128423 A1 * | 5/2010 | Moscovitch | 361/679.01 |

OTHER PUBLICATIONS

Garmin Nuvi 700 Owner's Manual, Jul. 2007, p. 3.
Garmin Mount sold within the U.S. during 2007.

* cited by examiner

*Primary Examiner* — Chandrika Prasad
(74) *Attorney, Agent, or Firm* — Samuel M. Korte

(57) ABSTRACT

A mounting assembly for mounting an electronic device to a surface of a vehicle includes a base for coupling with the surface and a socket assembly for supporting the electronic device on the base. The base includes a mounting ball, and the socket assembly includes a socket operable to frictionally engage the mounting ball to removably couple the socket assembly to the base. An electrical connector is attached to the mounting ball and coupled to an electrical system and another electrical connector is mounted within the socket to provide power to the electronic device when the socket assembly is coupled with the base. Structure limits rotation of the socket assembly relative to the base to inhibit the electrical connectors from becoming disconnected due to over-rotation of the socket assembly on the base.

19 Claims, 7 Drawing Sheets

MOUNTING ASSEMBLY HAVING A BASE WITH AN INNER BALL POSITIONED WITHIN A HOLLOW OUTER BALL

BACKGROUND

Many types of mounting assemblies have been developed to secure electronic devices to the dashboards, windshields, or other surfaces of vehicles. One such mounting assembly includes a base that may be secured to a vehicle surface and a cradle supported to the base via a permanent ball and socket joint. The ball and socket joint allows the cradle and its supported electronic device to be selectively positioned in any of a broad range of positions relative to the base, but does not permit the cradle to be easily removed from the base. Another type of mounting assembly includes a base and a cradle supported on the base via a separable ball and socket joint that permits the cradle and supported electronic device to be quickly and easily separated from the base.

SUMMARY

An embodiment of the mounting assembly comprises a base for coupling with a vehicle surface and a socket assembly configured to removably couple with the base and support an electronic device. The base includes a mounting ball with a plurality of integral electrical connectors. The socket assembly includes a socket with a plurality of integral electrical connectors. The two sets of electrical connectors are connected when the socket assembly is coupled with the base and disconnected when the socket assembly is detached from the base. The electrical connectors of the base may be hardwired or removably coupled to an electrical system such as the vehicle's electrical system. Such a configuration may enable the electronic device to be charged or otherwise powered while it is supported on the mounting assembly without connecting the electronic device directly to an external power cable. Such a configuration also may permit the socket assembly and electronic device to be quickly and easily disconnected from the base so the electronic device may be carried elsewhere.

In various embodiments, the base's mounting ball may comprise a substantially hollow outer ball and an inner ball positioned within and rotatable with respect to the outer ball, with the base's electrical connectors positioned on the inner ball. This configuration permits the electrical connectors on the inner ball to rotate with the electrical connectors in the socket when the socket assembly and its supported electronic device are pivoted or otherwise positioned relative to the base to inhibit or otherwise prevent the electrical connectors from disconnecting from one another.

In various embodiments, the mounting assembly may also include structure for limiting rotation of the inner ball with respect to the outer ball, and additional structure for limiting rotation of the socket assembly relative to the outer ball, to inhibit over-rotation of the socket assembly that could separate the two sets of electrical connectors. The structure for limiting rotation of the inner ball with respect to the outer ball may include a projection on an inner surface of the outer ball that is received in and moveable relative to a recessed region on an outer surface of the inner ball. Similarly, the structure for limiting rotation of the socket assembly relative to the outer ball may include a projection on an inner surface of the socket assembly that is received in and moveable relative to a recessed region on an outer surface of the outer ball. The projections cannot move beyond the boundaries or edges of their respective recessed regions, thus the size of the recessed regions defines the limits of rotation of the inner ball with respect to the outer ball and the socket assembly relative to the outer ball and thus the positional limits of the electronic device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
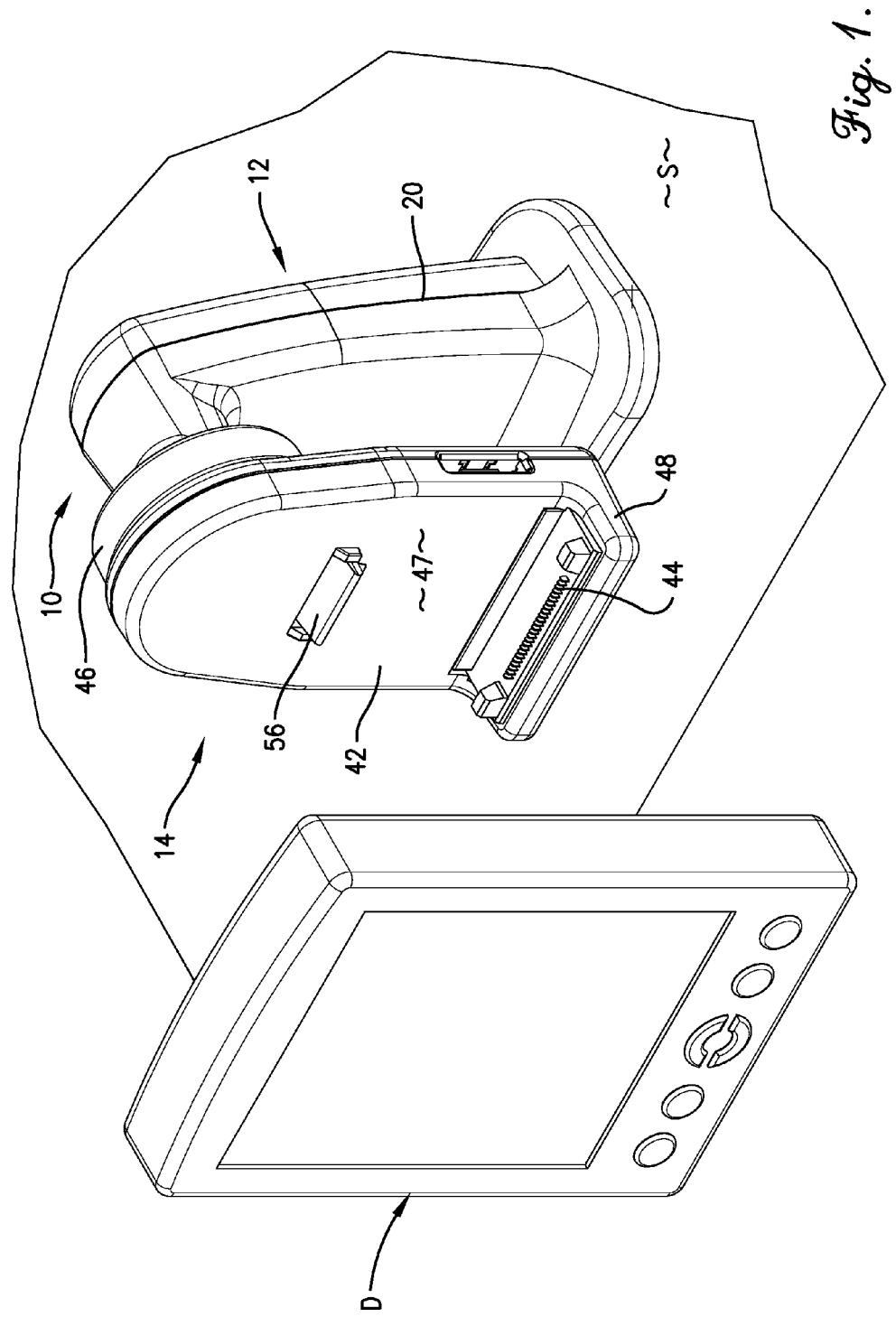
FIG. 1 is a front perspective view of a mounting assembly for a portable electronic device constructed according to an embodiment of the technology and shown attached to a surface of a vehicle.

The drawing figures do not limit the present invention to the specific embodiments disclosed and described herein. The drawings are not necessarily to scale, emphasis instead being placed upon clearly illustrating the principles of the technology.

DETAILED DESCRIPTION

The following detailed description of various embodiments of the present technology references the accompanying drawings which illustrate specific embodiments in which the technology can be practiced. The embodiments are intended to describe aspects of the technology in sufficient detail to enable those skilled in the art to practice them. Other embodiments can be utilized and changes can be made without departing from the scope of the technology. The following detailed description is, therefore, not to be taken in a limiting sense. The scope of the present technology is defined only by the appended claims, along with the full scope of equivalents to which such claims are entitled.

In general, embodiments of the technology include a mounting assembly for supporting an electronic device to a surface of a vehicle. The mounting assembly may comprise a base for mounting on or in the vehicle surface and a socket assembly configured to removably couple with the base and to support the electronic device. Both the base and the socket assembly include a set of integral electrical connectors that electrically couple with one another when the socket assembly is attached to the base. The electrical connectors on the base are electrically connected, directly or indirectly, to an electrical system such as the vehicle's electrical system, and the electrical connectors on the socket assembly are electrically connected to a charging conductor that engages the electronic device's power input when the electronic device is secured to the socket assembly.

In various embodiments, the base includes a mounting ball having a substantially hollow outer ball and an inner ball positioned within and rotatable with respect to the outer ball, with the electrical connectors of the base positioned on the inner ball. This configuration permits the electrical connectors on the inner ball to rotate with the electrical connectors on the socket assembly when the socket assembly and its supported electronic device are pivoted or otherwise positioned relative to the base so the two sets of connectors do not become disconnected. The mounting assembly may also include structure for limiting rotation of the inner ball with respect to the outer ball, and additional structure for limiting rotation of the socket assembly relative to the outer ball. Such structure inhibits over-rotation of the socket assembly that could disconnect the electrical connectors on the inner ball from the electrical connectors on the socket assembly.

Figure 2:
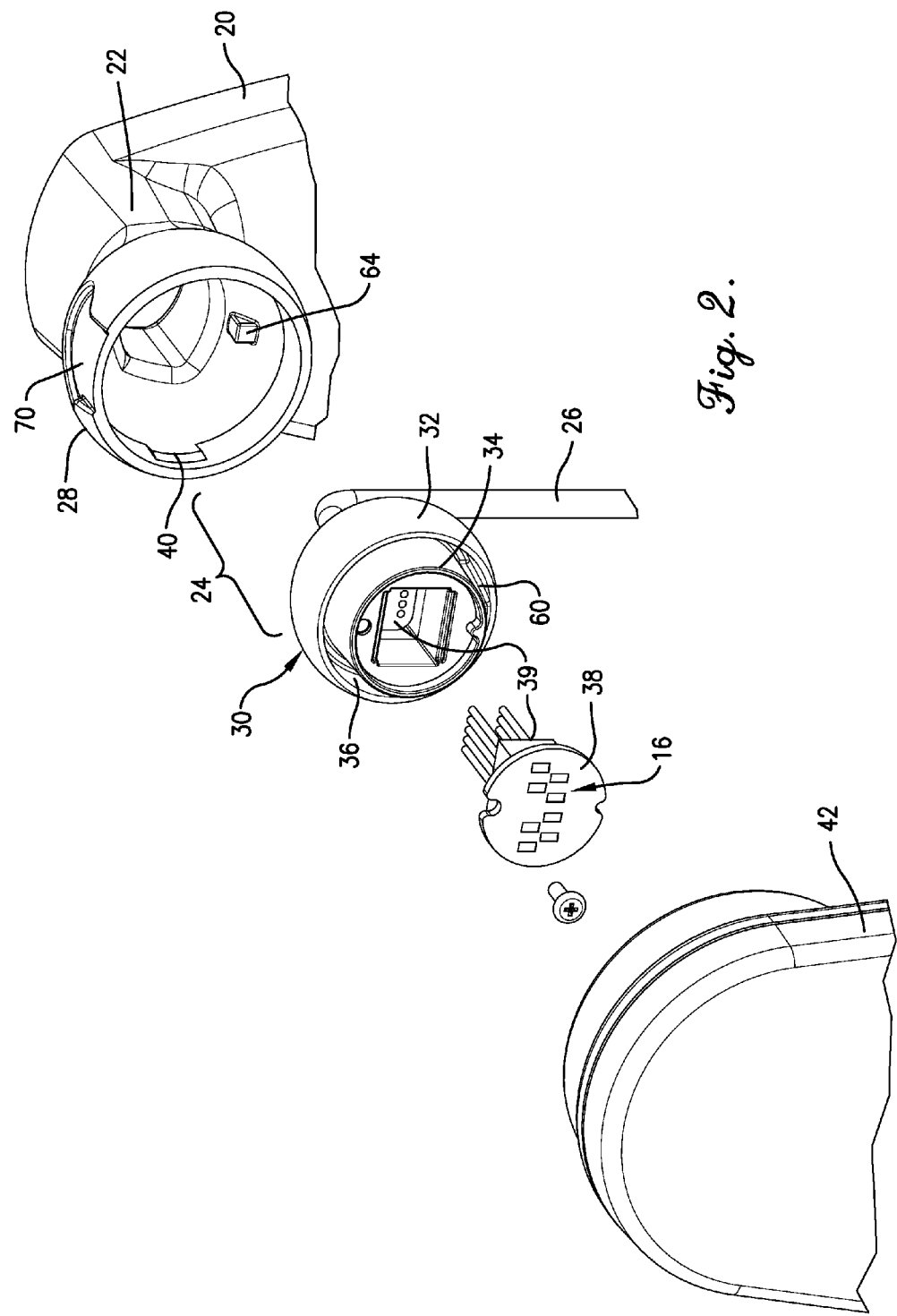
FIG. 2 is a fragmentary exploded front view of the mounting assembly.
Figure 3:
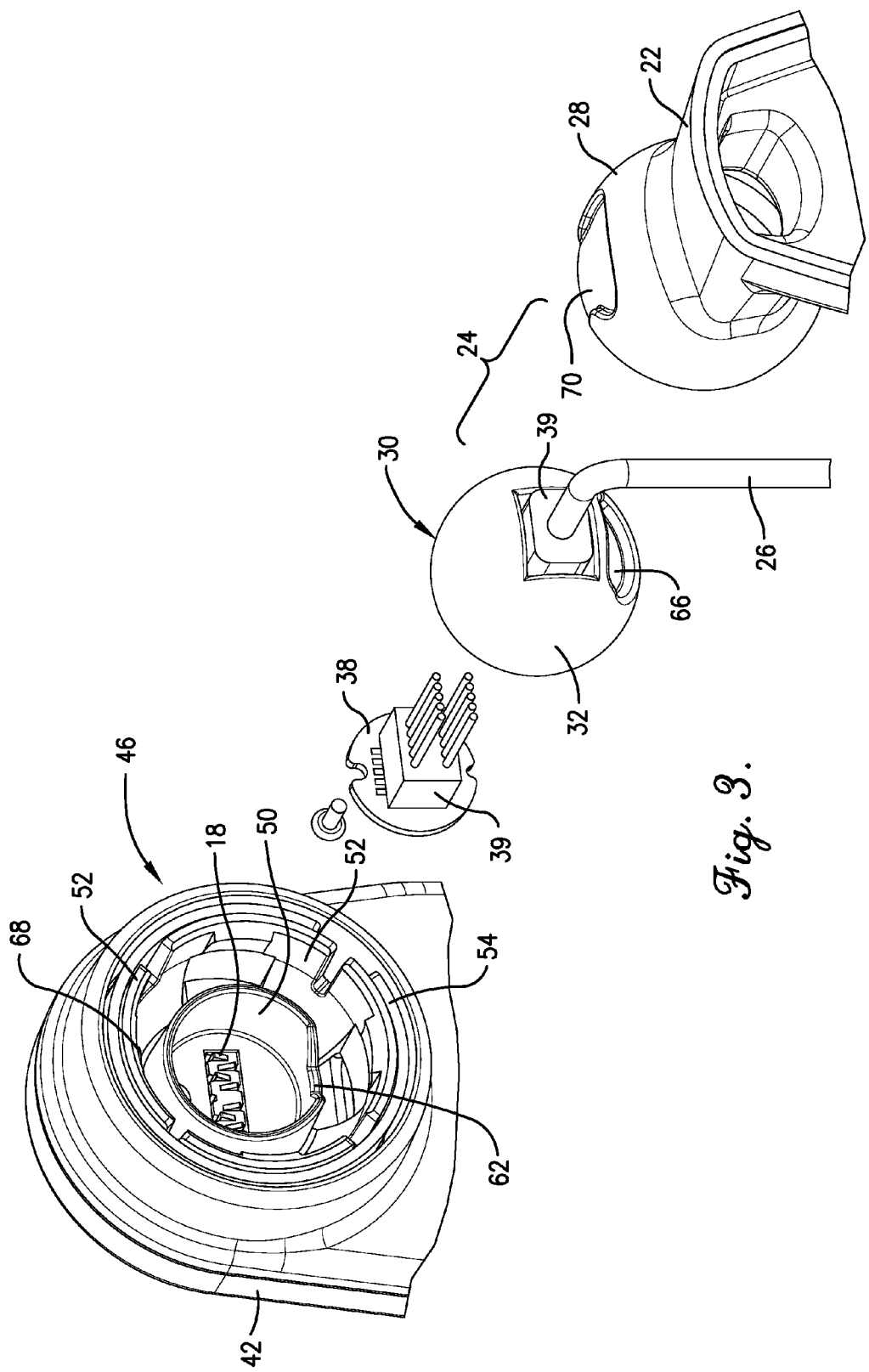
FIG. 3 is a fragmentary exploded rear view of the mounting assembly.

Exemplary embodiments of mounting assemblies employing the principles of the present technology will now be described in more detail with reference to the drawing figures. Turning initially to FIG. 1, an embodiment of a mounting assembly 10 broadly comprises a base 12 for coupling with a vehicle surface S and a socket assembly 14 configured to removably couple with the base 12 and support an electronic device D. As best illustrated in FIGS. 2 and 3, a set of electrical connectors 16 are attached to the base 12 and another set of electrical connectors 18 are attached to the socket assembly 14 for providing power and/or data to the electronic device D when the socket assembly 14 is attached to the base 12.

The mounting assembly 10 and other embodiments described and illustrated herein may support any electronic device D, such as a portable navigation device, a mobile phone, a portable media player, a mobile internet device, or a computing device, on any vehicle surface S, including a dashboard, windshield, window, or console. Unless noted otherwise herein, the components of the mounting assembly may be formed of any suitable materials such as plastic, lightweight metals, composite materials, etc.

Figure 5:
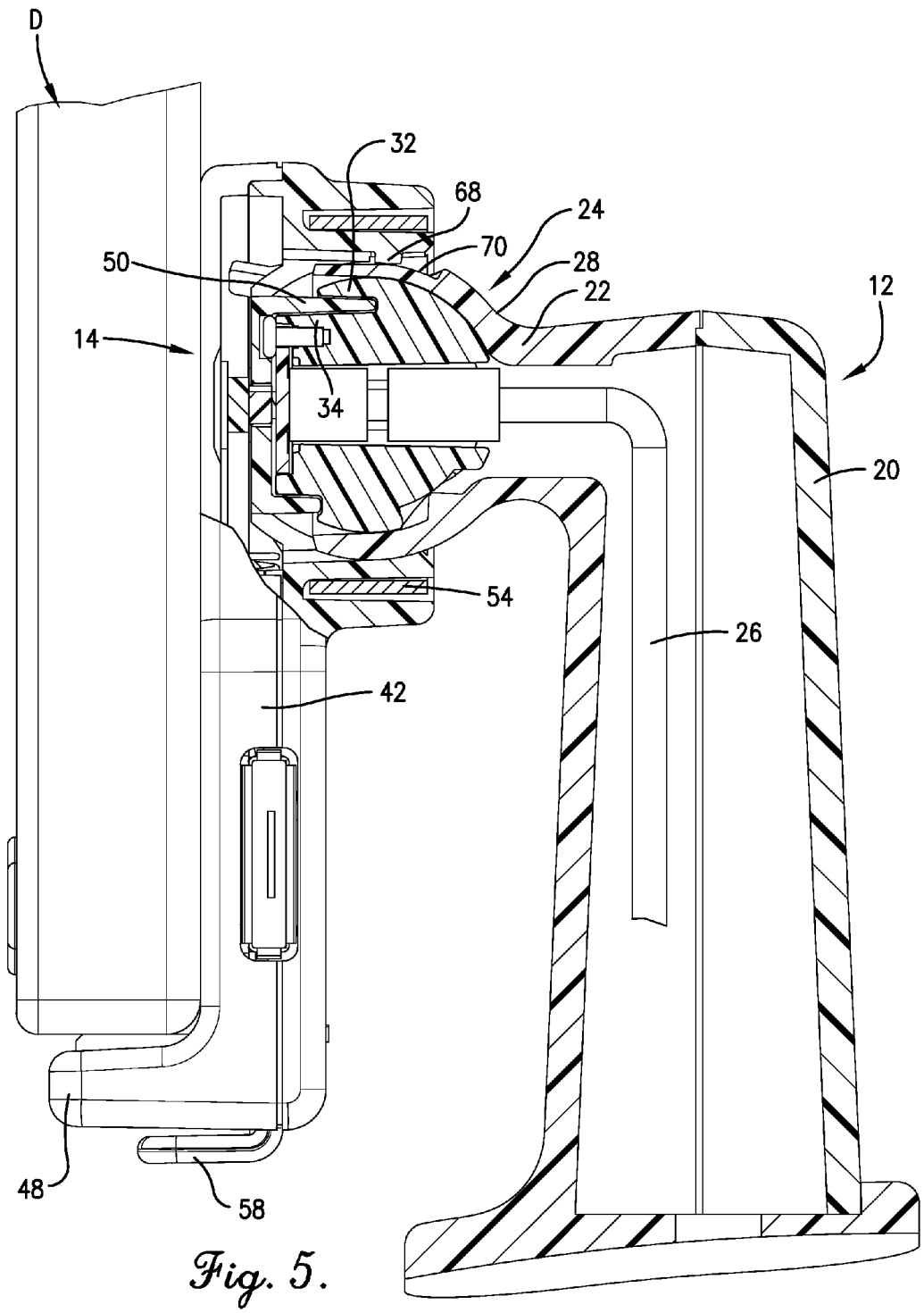
FIG. 5 is a partial vertical sectional view of the mounting assembly.

Referring primarily to FIG. 5, an embodiment of the base 12 includes a support section 20, a neck 22 projecting upwardly or outwardly from the support section 20, and a mounting ball 24 extending from the neck. The support section 20 anchors the other components of the mounting assembly 10 to the vehicle surface S and may be of a variety of shapes and sizes to accommodate any vehicle surface. In some embodiments, the support section is built into or integrally formed with the vehicle surface S. For example, as illustrated in FIG. 1, the support section 20 may be integrally formed into or otherwise permanently attached to a vehicle's dashboard. In these embodiments, the mounting assembly 10 may include a plurality of wires, cables, or other electrical conductors 26 enclosed within the support section 20 and electrically connected between the electrical connectors 16 and the vehicle's electrical system so as to connect the electrical connectors 16, and thus the supported electronic device D, to the vehicle's electrical system.

In other embodiments, the support section 20 may be part of a removable suction cup type mount, such as the mounts disclosed in U.S. Pat. No. 7,296,771, or a removable friction type mount, such as the mounts disclosed in U.S. Pat. No. 7,380,759. Both of these patents are incorporated in their entirety into the present application by reference. In these embodiments, the mounting assembly 10 may include a power connector, socket, or other input terminal mounted on the support section for connecting to an external power cable. For example, in one embodiment, a USB port, mini-USB port, or other input may be positioned on the support section for connecting with a vehicle power adapter cable that may plug into a power socket of a vehicle. The power input on the support section is then electrically connected to the electrical connectors 16 via a plurality of wires, cables, or other conductors extending through the support section.

Referring now to FIGS. 2, 3, 4, and 9, an embodiment of the mounting ball 24 comprises a substantially hollow outer ball 28 attached to and projecting from the neck 22 of the support section 20 and an inner ball 30 positioned within and rotatable with respect to the outer ball.

The outer ball 28 is generally semi-spherical and presents an enlarged front opening that permits the inner ball 30 to be inserted within the outer ball as described in more detail below. The outer ball 28 may also present a smaller rear opening in alignment with a passageway in the neck 22 for permitting passage of the electrical conductors 26 connected to the vehicle's electrical system. The outer ball 28 is substantially rigid to prevent deformation thereof and presents an outer surface that introduces sufficient friction between the outer ball and the socket assembly to resist movement of the electronic device D relative to the base 12. The outer ball 28 may be constructed of plastic or another sturdy material that presents a rough surface, or may be coated to present a rough or soft surface with the friction characteristics described above. In one embodiment, the outer ball 28 has an outside diameter between about 17 mm and 25 mm and an inside diameter between about 13 mm and 21 mm, but it may be of any size without departing from the scope of the present technology.

Figure 6:
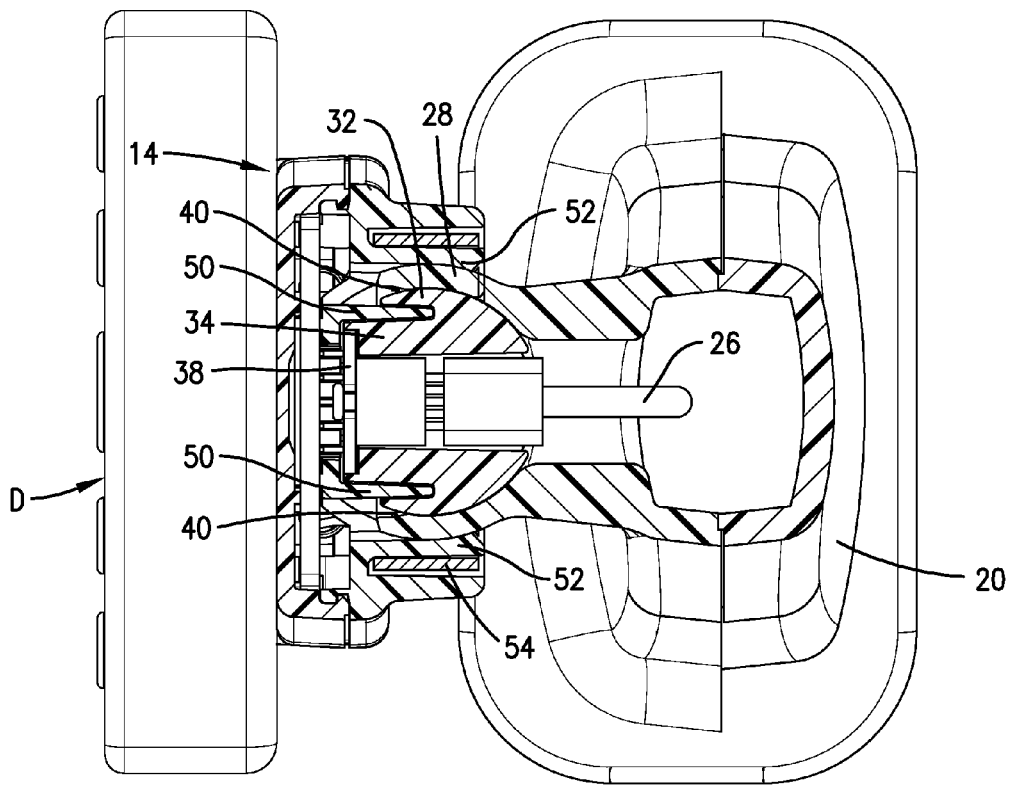
FIG. 6 is a horizontal sectional view of the mounting assembly.
Figure 7:
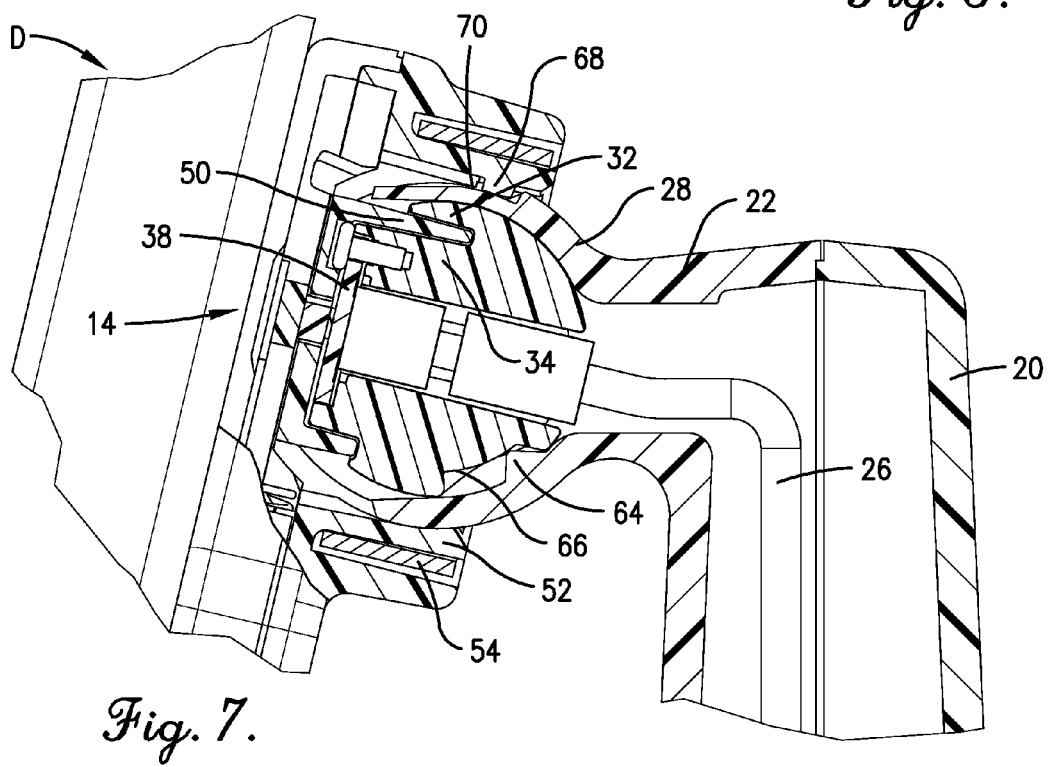
FIG. 7 is a fragmentary vertical sectional view of the mounting assembly.

As best illustrated in FIGS. 2, 6, and 7, the inner ball 30 comprises a generally semi-spherical outer portion 32 and a generally cylindrical inner portion 34 positioned within and spaced from the outer portion. The spacing between the outer portion 32 and inner portion 34 defines an annular gap 36, the purpose of which is described below. The inner ball 30 presents a front opening for receiving a portion of the socket assembly as described below and a smaller rear opening in alignment with the passageway in the neck 22 for permitting passage of the electrical conductors 26. In one embodiment, the inner ball has an outside diameter of between about 16.9 mm and 20.9 mm.

The base's electrical connectors 16 are attached to the front face of the rotatable inner ball 30 and are electrically connected to the electrical conductors 26 extending through the base. This configuration connects the electrical connectors 16 to the vehicle's electrical system while permitting them to rotate with the electrical connectors 18 in the socket when the socket assembly 14 and its supported electronic device D are pivoted or otherwise positioned relative to the base 12 to inhibit the electrical connectors 16, 18 from disconnecting from one another. In one embodiment, the electrical connectors 16 are printed or otherwise attached to a small circuit board 38 that is attached to the front face of the inner ball 30. The circuit board 38 may then be connected to the electrical conductors 26 via a pair of connectors 39 best shown in FIGS. 2 and 3.

The mounting assembly 10 may also include structure for retaining the inner ball 30 within the outer ball 28 while still permitting the inner ball 30 to rotate within the outer ball 28. As best illustrated in FIGS. 2 and 6, this structure may include a pair of inwardly projecting tabs 40 positioned on opposite sides of the inner wall of the outer ball 28. The inner ball 30 snaps over these tabs 40 when it is inserted in the outer ball 28, and the tabs 40 retain the inner ball 30 within the outer ball 28 unless a significant force is applied to the rear of the inner ball.

Turning now to FIGS. 1, 3, 4, and 5, an embodiment of the socket assembly 14 comprises a body section 42 for supporting the electronic device D, a charging conductor 44 positioned on one side of the body for electrically coupling with a power input of the electronic device D, and a socket 46 positioned in the opposite side of the body section for removably coupling with the mounting ball 24 of the base 12.

The body section 42 may be of any size or shape suitable to support the electronic device D. An embodiment of the body section 42 includes a generally upstanding back-wall 47 and a perpendicularly-extending ledge 48. The charging conductor 44 is positioned on the ledge 48 and is electrically connected with the electrical connectors 18 in the socket 46 via wires or any other conductors.

The socket 46 is positioned on the rear face of the body section 42 and includes an orifice or opening formed in the body section 42, a generally cylindrical wall 50 positioned within the orifice that defines an inner seat for engaging the inner ball 30 of the mounting ball, a plurality of interconnected arms 52 spaced from the wall 50 that define an outer seat for engaging the outer ball 28 of the mounting ball, and a spring element 54 for biasing the arms 52 inwardly toward the outer ball.

Figure 4:
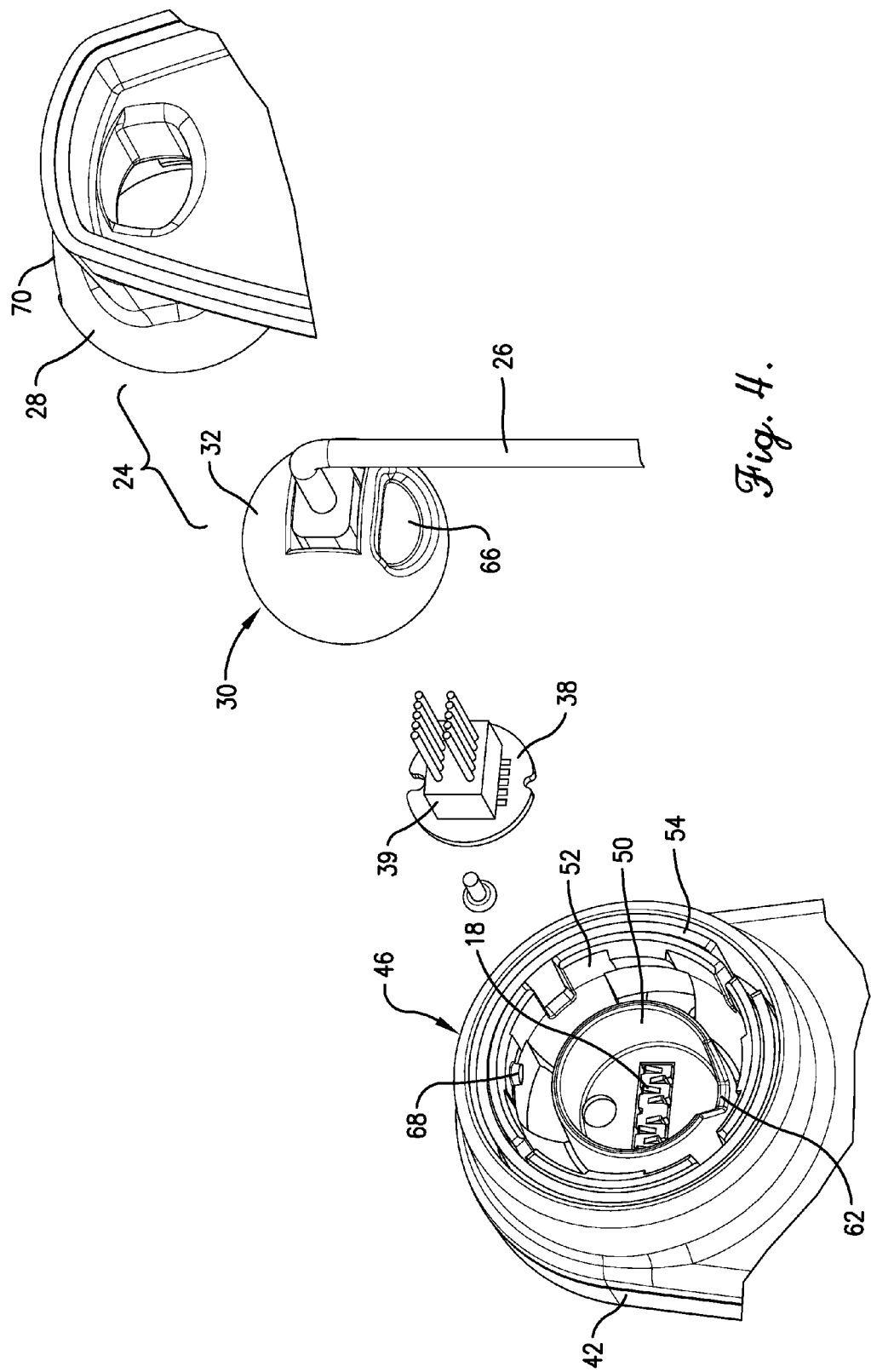
FIG. 4 is another fragmentary exploded rear view of the mounting assembly.

As best shown in FIGS. 5, 6, and 7, the cylindrical wall 50 is sized and configured to fit within the annular gap 36 between the outer 32 and inner portions 34 of the inner ball 30 when the socket assembly 14 is attached to the base 12. As best illustrated in FIGS. 3 and 4, the socket assembly's electrical connectors 18 are positioned within the cylindrical wall 50 so as to electrically connect with the electrical connectors 16 of the base 12 when the socket assembly 14 is mounted on the base 12. This configuration causes the inner ball 30, and its supported electrical connectors 16, to rotate with the socket assembly 14 as the socket assembly and its supported electronic device D are positioned relative to the base 12. In one embodiment, the electrical connectors 18 on the socket assembly 14 are compression type electrical connectors that compress against the electrical connectors 16 on the inner ball 30 when the socket assembly 14 is mounted on the base 12.

As best illustrated in FIGS. 3, 4, and 5, the plurality of flexible interconnected arms 52 that define the outer seat are sized and configured to receive and engage the outer ball 28. The spring element 54 partially encircles the arms 52 and is operable to bias the arms inwardly to contact the outer ball 28 when the outer ball is in the socket 46, while allowing the arms 52 to flex outwardly to receive and release the outer ball 28. The spring element 54 may be a metal spring ring that substantially encircles the arms 52. One embodiment of the spring is approximately one-quarter to one-half inch wide, approximately three-quarters of an inch in diameter, and presents a gap of approximately one-eighth to one-quarter inch between ends thereof. The gap allows the spring ring to flex. When the mounting ball 24 is not in the socket 46, the spring element 54 is relaxed and applies little or no biasing pressure on the arms 52. When the mounting ball 24 is forced into the socket 46, the arms 52 flex outwardly and engage the spring element 54, causing the spring element to also flex outwardly. When the mounting ball 24 is snapped into its seated position, the spring element 54 biases the arms 52 inwardly against the mounting ball. Thus, the arms 52 and the spring element 54 cooperate to frictionally resist rotation of the mounting ball within the socket and to retain the mounting ball in the socket.

As best illustrated in FIG. 1, the socket assembly 14 may include a latch 56 or other structure for locking the electronic device D to the socket assembly 14. The latch 56 fits within a slot or other recessed area on the back of the electronic device and is biased downwardly into a locked position by a pair of springs inside the socket assembly. As best illustrated in FIG. 5, the latch 56 may be shifted to an unlocked position by a lever 58 that extends below the ledge 48. The lever 58 is attached to the latch 56 and may be manually pushed upwards, against the force of the springs, to shift the latch 56 upward and out of the slot on the back of the electronic device D to permit the electronic device to be removed from the socket assembly 14.

Embodiments of the mounting assembly 10 may also include a keying assembly for aligning the mounting ball 24 within the socket 46. As best illustrated in FIGS. 2, 3, and 4, the keying assembly may include a key 60 on the inner ball 30 that fits within a corresponding keyway 62 in the cylindrical wall 50 of the socket. This configuration prevents the socket assembly 14 from being positioned on the base 12 in any orientation other than an upright orientation.

Figure 8:
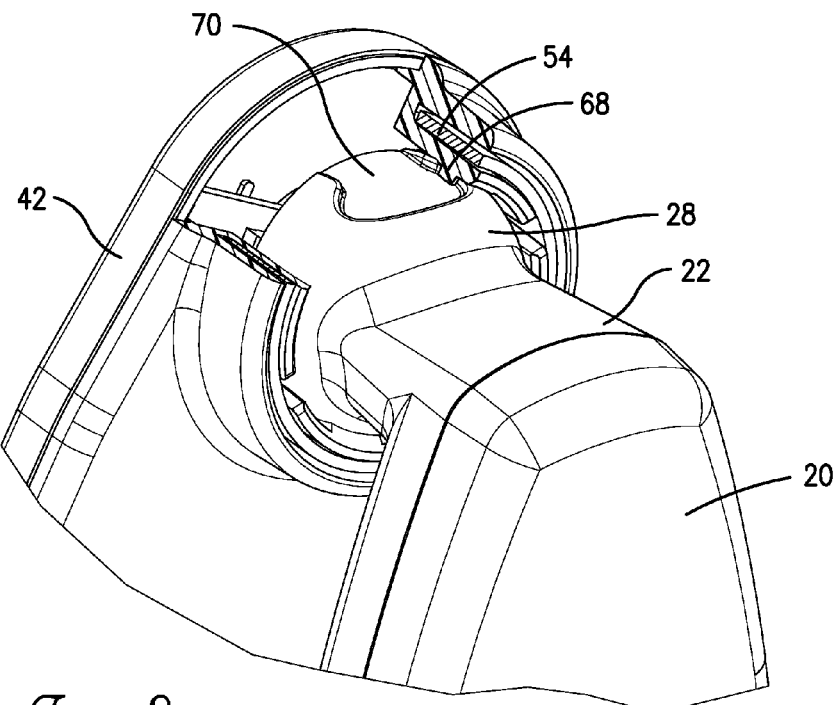
FIG. 8 is a fragmentary rear view of the mounting assembly.
Figure 9:
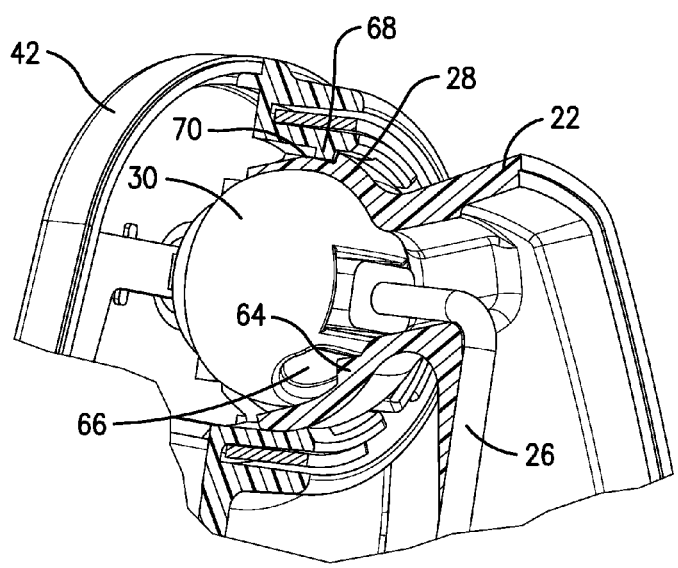
FIG. 9 is another fragmentary rear view of the mounting assembly.

Over-rotation of the socket assembly 14 relative to the base 12 could disconnect the electrical connectors 18 on the socket assembly 14 from the electrical connectors 16 on the base. To prevent this, the mounting assembly 10 may include structure for limiting rotation of the inner ball with respect to the outer ball, and additional structure for limiting rotation of the socket assembly relative to the outer ball. As best illustrated in FIGS. 2, 4, and 9, the structure for limiting rotation of the inner ball with respect to the outer ball may include a projection 64 on an inner surface of the outer ball 28 that is received in and moveable relative to a recessed region 66 on an outer surface of the inner ball 30. Similarly, as best illustrated in FIGS. 3, 4, and 8, the structure for limiting rotation of the socket assembly 14 relative to the outer ball 28 may include a projection 68 on an inner surface of the socket 46 that is received in and moveable relative to a recessed region 70 on an outer surface of the outer ball 28. The projections 64, 68 cannot move beyond the boundaries or edges of their respective recessed regions 66, 70, thus the size of the recessed regions 66, 70 defines the limits of rotation of the inner ball 30 with respect to the outer ball 28 and the socket assembly 14 relative to the outer ball 28 and thus the positional limits of the electronic device D. In some embodiments, the recessed regions 66, 70 are sized to permit approximately 30° of rotation of the socket assembly relative to the base, in all directions. In other embodiments, the recessed regions 66, 70 are sized to permit between 5° and 40° of relative rotation in all directions.

In addition, or as an alternative, to providing power to the electronic device D, the electrical connectors 16 on the base and the cable or other conductors 26 may also be wired to the vehicle's on-board diagnostics (OBD) bus to provide data to or receive data from the electronic device. For example, the electrical connectors 16 may be configured for exchanging traffic data, audio signals, cartographic data, vehicle speed and heading data, and/or other data between the electronic device D and the vehicle OBD bus. In one particular embodiment, the electrical connectors 16 may include terminals for handling 8 signals.

Embodiments of the mounting assembly 10 that include a base 12 integrated into or permanently attached to a vehicle surface S as shown in FIG. 1 may be used to quickly and conveniently support the electronic device D to the vehicle surface S by first attaching the socket assembly 14 to the base 12, then positioning the socket assembly 14 in a desired orientation relative to the base, and finally attaching the electronic device D to the socket assembly. While the electronic device D is in the mount, it can be powered or charged by the vehicle's electrical system without connecting a power cable directly to the electronic device. When it is desired to remove the electronic device from the mounting assembly, it can be quickly removed from the socket assembly or the socket assembly and the electronic device can be separated from the base by disconnecting the socket from the mounting ball.

Similarly, embodiments of the mounting device that include a base that can be removably mounted on a vehicle surface may be used to quickly and conveniently support an electronic device to the vehicle surface by first attaching the base to the surface, then attaching the socket assembly to the base, then positioning the socket assembly in a desired orientation, and finally attaching the electronic device to the socket assembly. While the electronic device is in the mount, it can be powered or charged by the vehicle's electrical system without connecting a power cable directly to the electronic device. When it is desired to remove the electronic device from the mounting assembly, it can be quickly removed from the socket assembly or the socket assembly and the electronic device can be separated from the base by disconnecting the socket from the mounting ball. Also, in these embodiments, the base itself may be removed from and/or repositioned on the vehicle surface.

Although the invention has been described with reference to the preferred embodiment illustrated in the attached drawing figures, it is noted that equivalents may be employed and substitutions made herein without departing from the scope of the invention as recited in the claims.

What is claimed is:

1. A mounting assembly for removably mounting an electronic device to a surface, the mounting assembly comprising:
   a base for coupling with the surface, the base comprising a mounting ball with a plurality of electrical connectors attached thereto; and
   a socket assembly for supporting the electronic device and removably coupling with the mounting ball, the socket assembly comprising a plurality of electrical connectors attached thereto that electrically couple with the electrical connectors of the base when the socket assembly is coupled with the base, wherein the mounting ball comprises a substantially hollow outer ball and an inner ball positioned within and rotatable with respect to the outer ball.

2. The mounting assembly as set forth in claim 1, wherein the electrical connectors of the base are positioned on the inner ball.

3. The mounting assembly as set forth in claim 2, further including structure for limiting rotation of the inner ball with respect to the outer ball to inhibit the electrical connectors on the inner ball from disconnecting from the electrical connectors on the socket assembly.

4. The mounting assembly as set forth in claim 3, wherein the structure for limiting rotation of the inner ball comprises a projection on an inner surface of the outer ball that is received in and moveable relative to a recessed region on an outer surface of the inner ball.

5. The mounting assembly as set forth in claim 2, further including structure for limiting rotation of the socket assembly relative to the base.

6. The mounting assembly as set forth in claim 5, wherein the structure for limiting rotation of the socket assembly comprises a projection on an inner surface of the socket assembly that is received in and moveable relative to a recessed region on an outer surface of the outer ball.

7. The mounting assembly as set forth in claim 1, wherein the base is fixedly attached to the surface, integrally formed with the surface, or frictionally and removably coupled with the surface.

8. The mounting assembly as set forth in claim 1, further comprising a keying assembly for aligning the mounting ball within the socket.

9. The mounting assembly as set forth in claim 8, wherein the keying assembly comprises a key on the mounting ball that fits within a corresponding keyway in the socket assembly.

10. The mounting assembly as set forth in claim 1, wherein the inner ball comprises a generally semi-spherical and hollow outer portion and a generally cylindrical and hollow inner portion positioned within and spaced from the semi-spherical outer portion, and wherein the mounting assembly further comprises a plurality of electrical conductors extending through the cylindrical and hollow inner portion and connected to the electrical connectors of the base for delivering power to the electrical connectors.

11. The mounting assembly as set forth in claim 10, wherein the socket assembly comprises a body for supporting the electronic device, a charging conductor positioned on the body for electrically coupling with a power input of the electronic device, and a socket positioned in the body for removably coupling with the mounting ball of the base.

12. The mounting assembly as set forth in claim 11, wherein the socket comprises an orifice formed in the body, an inner seat positioned within the orifice for engaging the inner ball of the mounting ball, an outer seat positioned within the orifice and surrounding the inner seat for engaging the outer ball of the mounting ball, and a spring element for biasing the outer seat toward the outer ball.

13. The mounting assembly as set forth in claim 12, wherein the inner seat comprises a generally cylindrical wall that receives the cylindrical and hollow inner portion of the inner ball when the socket assembly is coupled with the base.

14. The mounting assembly as set forth in claim 12, wherein the outer seat comprises a plurality of flexible interconnected arms that receive the outer ball when the socket assembly is coupled with the base.

15. A mounting assembly for removably mounting an electronic device to a surface of a vehicle, the mounting assembly comprising:
   a base for coupling with the surface, the base comprising a support section and a mounting ball extending from the support section, the mounting ball comprising a substantially hollow outer ball fixed to the support section, an inner ball positioned within and rotatable with respect to the outer ball, and a plurality of electrical connectors positioned on the inner ball;
   a socket assembly for supporting the electronic device and removably coupling with the base, the socket assembly comprising a body for supporting the electronic device, a socket formed in the body, and a plurality of integral electrical connectors positioned in the socket that electrically couple with the electrical connectors of the base when the socket assembly is coupled with the base; and
   structure for limiting rotation of the inner ball with respect to the outer ball to inhibit the electrical connectors on the inner ball from disconnecting from the electrical connectors in the socket.

16. The mounting assembly as set forth in claim 15, wherein the structure for limiting rotation of the inner ball comprises a projection on an inner surface of the outer ball that is received in and moveable relative to a recessed region on an outer surface of the inner ball.

17. The mounting assembly as set forth in claim 15, further including structure for limiting rotation of the socket assembly relative to the base, the structure for limiting rotation of the socket assembly comprising a projection on an inner surface of the socket that received in and moveable relative to a recessed region on an outer surface of the outer ball.

18. An electronic assembly for mounting to a surface of a vehicle, the electronic assembly comprising:
  a mounting assembly comprising—
    a base for coupling with the surface, the base comprising a mounting ball, the mounting ball comprising a substantially hollow outer ball, an inner ball positioned within and rotatable with respect to the outer ball, and a plurality of electrical connectors positioned on the inner ball,
    a socket assembly for supporting the electronic device and removably coupling with the base, the socket assembly comprising a body, a charging conductor positioned on the body, a socket formed in the body for receiving the mounting ball, and a plurality of electrical connectors positioned in the socket that electrically couple with the electrical connectors of the base when the socket assembly is coupled with the base, and
    structure for limiting rotation of the inner ball with respect to the outer ball to prevent the electrical connectors on the inner ball from disconnecting from the electrical connectors in the socket; and
  an electronic device that may be removably mounted on the socket assembly and electrically connected to the charging conductor.

19. The mounting assembly as set forth in claim 18, wherein the structure for limiting rotation of the inner ball comprises a projection on an inner surface of the outer ball that is received in and moveable relative to a recessed region on an outer surface of the inner ball.

* * * * *